US 6,858,964 B2

(12) United States Patent
Masumoto et al.

(10) Patent No.: US 6,858,964 B2
(45) Date of Patent: Feb. 22, 2005

(54) STATOR IRON CORE OF ELECTRIC MOTOR, MANUFACTURING METHOD THEREOF, ELECTRIC MOTOR, AND COMPRESSOR

(75) Inventors: Kouji Masumoto, Tokyo (JP); Tomoaki Oikawa, Tokyo (JP); Tsuneyoshi Tajima, Tokyo (JP); Osamu Kazama, Tokyo (JP); Masaki Kato, Tokyo (JP); Toshio Arai, Tokyo (JP); Takuhito Miyajima, Tokyo (JP); Hiroyuki Akita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 93 days.

(21) Appl. No.: 10/247,474

(22) Filed: Sep. 20, 2002

(65) Prior Publication Data

US 2003/0020358 A1 Jan. 30, 2003

Related U.S. Application Data

(62) Division of application No. 09/783,976, filed on Feb. 16, 2001.

(30) Foreign Application Priority Data

Feb. 21, 2000 (JP) .................................. 2000-042831
Sep. 18, 2000 (JP) .................................. 2000-281176

(51) Int. Cl.⁷ .............................. H02K 1/06; H02K 1/18
(52) U.S. Cl. .................................. 310/216; 310/217
(58) Field of Search .............................. 310/216–218, 310/254, 42, 258, 259; 336/212, 233, 234; 29/596–598

(56) References Cited

U.S. PATENT DOCUMENTS

| | | | | |
|---|---|---|---|---|
| 3,842,493 A | * | 10/1974 | Ohuchi et al. | 29/596 |
| 3,885,302 A | * | 5/1975 | Boesel | 29/596 |
| 4,012,653 A | * | 3/1977 | Shigeta et al. | 310/217 |
| 4,102,040 A | * | 7/1978 | Rich | 29/598 |
| 4,348,607 A | * | 9/1982 | Tankred et al. | 310/217 |
| 4,745,320 A | * | 5/1988 | Oyama et al. | 310/217 |
| 5,583,387 A | | 12/1996 | Takeuchi et al. | |
| 5,786,651 A | * | 7/1998 | Suzuki | 310/259 |
| 5,859,486 A | | 1/1999 | Nakahara et al. | 310/254 |
| 5,986,377 A | * | 11/1999 | Yamada et al. | 310/216 |
| 6,049,153 A | * | 4/2000 | Nishiyama et al. | 310/156.53 |
| 6,121,711 A | | 9/2000 | Nakahara et al. | 310/254 |
| 6,127,753 A | * | 10/2000 | Yamazaki et al. | 310/71 |
| 6,167,610 B1 | | 1/2001 | Nakahara et al. | 29/596 |
| 6,226,856 B1 | | 5/2001 | Kazame et al. | |
| 6,369,687 B1 | | 4/2002 | Akita et al. | |
| 6,429,568 B1 | * | 8/2002 | Shen et al. | 310/254 |

FOREIGN PATENT DOCUMENTS

| | | | | |
|---|---|---|---|---|
| CN | 1178410 A | | 4/1998 | |
| JP | 2-97243 | * | 9/1990 | 310/217 |
| JP | 7-7875 | | 1/1995 | |
| JP | 8-149725 | | 6/1996 | |
| JP | 8-182231 | | 7/1996 | |

(List continued on next page.)

Primary Examiner—Tran Nguyen
(74) Attorney, Agent, or Firm—Oblon, Spivak, McClelland, Maier & Neustadt, P.C.

(57) ABSTRACT

A stator iron core of an electric motor including plural magnetic pole segments. Each of the pole segments include a back yoke portion, a teeth portion projected from the back yoke portion, a connection portion provided to the back yoke portion for connecting adjacent magnetic pole segments, and a stepped-shaped notch on an outer circumference of the back yoke portion. Further, the stator iron core is circularly formed by bending the connection portions of the plural magnetic pole segments.

5 Claims, 17 Drawing Sheets

FOREIGN PATENT DOCUMENTS

| | | |
|---|---|---|
| JP | 9-9536 | 1/1997 |
| JP | 9-191588 | 7/1997 |
| JP | 09-275669 | 10/1997 |
| JP | 10-42495 | 2/1998 |
| JP | 10-285840 | 10/1998 |
| JP | 11-027886 | 1/1999 |
| JP | 11-069670 | 3/1999 |
| JP | 2000-116074 | 4/2000 |
| JP | 2001-103690 | 4/2001 |

* cited by examiner

US 6,858,964 B2

STATOR IRON CORE OF ELECTRIC MOTOR, MANUFACTURING METHOD THEREOF, ELECTRIC MOTOR, AND COMPRESSOR

This application is a division of Ser. No. 09/783,976 filed Feb. 16, 2001.

BACKGROUND OF THE INVENTION

1. Field of the Invention

The present invention relates to an electric motor driving a compressor used for an air conditioner or a freezer, in particular, to a stator iron core of the electric motor and a method for manufacturing the stator iron core of the electric motor.

2. Description of the Related Art

FIG. 13 is a plan view of a conventional stator of an electric motor disclosed by the same applicant in Japanese Patent Application No. 11-020128. In the figure, a reference numeral 3 shows a plate-shaped core segment (magnetic pole segment) made of magnetic material. At one end of the magnetic pole segment, a concave portion 3a and a convex portion 3b are formed on both surfaces as a connection means. At the same time, an end face 3c of the magnetic pole segment having an arc shape (male shape) is formed on a circumference of a circle having the same center as the center of the concave portion 3a and the convex portion 3b. At the other end of the segment, an end face 3d having an arc shape (female shape) is formed so as to be engaged with an end face 3c of an adjoining magnetic pole segment 3. A reference numeral 4 shows a first iron core member in which plural magnetic pole segments 3 are aligned via the end face 3c and the end face 3d.

FIG. 14 is a cross sectional view taken along the line DD of FIG. 10.

As shown in FIG. 14, a reference numeral 5 shows a second iron core member in which plural magnetic pole segments 3 are aligned in the longitudinal direction (as shown by an arrow X). The first iron core member 4 and the second iron core member 5 are stacked or laminated alternately. In the stacking direction (as shown by an arrow Y), the concave portion 3a of the magnetic pole segment 3 and the convex portion 3b of the adjoining magnetic pole segment are engaged, so that both magnetic pole segments 3 are connected in the longitudinal direction (as shown by the arrow X) so as to rotate around the center of the concave portion 3a and the convex portion 3b in the direction of an arrow R. A reference numeral 6 shows a coil wire wound around each magnetic pole segment 3, and 7 shows an iron core formed circularly by turning the concave portion 3a and the convex portion 3b of each magnetic pole segment 3 made by laminating both iron core members.

In the following, a method for manufacturing the conventional iron core structured as described above will be explained. FIG. 15 shows a magnetic member plate for manufacturing the magnetic pole segment 3.

As the first step for processing the first iron core member 4, surrounding portions of the both end faces 3c and 3d are formed by punching (or stamping) out portions shown by a real line within a hatched portion at a location indicated by an arrow A in FIG. 15. As the first step for processing the second iron core member 5, surrounding portions of the both end faces 3c and 3d are formed by punching portions shown by a real line within a hatched portion at a location indicated by an arrow B in FIG. 15. By the above punching operation, the concave portion 3a and the convex portion 3b, which can be engaged with each other, are formed on both surfaces of the end portions, on which the arc end face 3c of the magnetic pole segment 3 are made as shown in FIG. 16. At the same time, a hole portion 3h is formed on the magnetic pole segment 3 of the top layer so as to be engaged with the convex portion 3b of the magnetic pole segment 3 of the lower layer.

Next, at a location indicated by an arrow C in FIG. 15, the first iron core member 4 and the second iron core member 5 are formed by serially and alternately punching a portion shown by a real line within a hatched portion, that is, a surrounding portion of the both end faces 3c and 3d, which are formed at the location indicated by the arrow A, and a surrounding portion of the both end faces 3c and 3d, which are formed at the location indicated by the arrow B. These iron core members 4, 5 are sequentially and alternately stacked or laminated within a metal stacker.

Subsequently, the coil wire 6 is wound, and the iron core 7 can be circularly formed by turning the concave portion 3a and the convex portion 3b, which are engaged in the laminating direction, of each magnetic pole segment 3.

FIG. 17 shows a part of the iron core which has been circularly formed. In FIG. 17, 2 shows a slot which is a space for winding the coil wire 6. Further, 2a shows a bottom portion of the slot 2 which has an angular portion made by abutting straight line portions 2b of the magnetic pole segment 3 and of the adjoining magnetic pole segment 3. In FIG. 17, the coil wire 6, which exists, is not illustrated for clarifying the explanation.

FIGS. 18 and 19 show a conventional stator iron core of an electric motor disclosed by the Japanese Unexamined Patent Publication No. HEI 9-191588. As shown in FIG. 18, predetermined pieces of magnetic material are staked or laminated, in which plural magnetic pole segments 101 are connected via a thin connection portion 102. Confronting surfaces 102a and 102b of the connection portion are provided on both sides of the thin connection portion 102. Further, confronting surfaces 101b and 101c are provided on ends of the magnetic pole segments 101 located at far ends. The confronting surfaces 101b and 101c have the same shape as the confronting surfaces 102a and 102b.

A coil wire (not shown in the figure) is would around each magnetic pole segment in the stator structured above. As shown in FIG. 19, each thin connection portion 102 is bent, the confronting surfaces 102a and 102b of the connection portion located on both sides of the thin connection portion 102 are joined, and finally, the confronting surfaces 101b and 101c of the end portions are joined to circularly form the stator iron core of the electric motor.

The conventional stator iron core of the electric motor is structured as shown in FIG. 13. The bottom portion 2a of the slot 2, which is made by circularly forming the stator iron core, has a fine angle as shown in FIG. 17, so that the stress of the load is concentrated to that angular portion when the load is applied to the bottom portion on circularly forming the iron core 7. Further, when the electric motor is mounted in a compressor, etc. by fixing into a housing and the like of the compressor with shrink-fitting (to insert the electric motor into the expanded housing by heating) or press-fitting (to insert the electric motor into the tight housing by pressure), the fixing force is concentrated to the angular portion. Accordingly, the performance of the magnetic material is reduced, which causes problems that the efficiency of the electric motor is reduced, it becomes difficult to keep a sufficient stiffness, and further, vibration or noise may be generated during the driving of the electric motor.

The conventional stator iron core of the electric motor is structured as shown in FIG. 13. Accordingly, when the electric motor is mounted in the compressor by fixing in the housing and the like with shrink-fitting or press-fitting, an outer circumference of the stator iron core around the concave portion 3a and the convex portion 3b, which rotate when the iron core is circularly formed, may contact with an inner perimeter of the housing. This means the stator iron core tend to be influenced by the dimensional precision of the housing and the like, namely, a circularity of the outer circumference and the inner circumference of the stator iron core of the electric motor tends to become worse by the contact force at the time of shrink-fitting or press-fitting. Further, when the circularity becomes worse, an air gap between the stator and the rotor becomes irregular at the time of driving the electric motor. This may generate magnetic unbalance of the electric motor, and also causes a problem to generate noise or vibration.

The conventional stator iron core of the electric motor is structured as shown in FIGS. 18 and 19. Accordingly, the confronting surfaces 101b and 101c of the end portions are easily dislocated in the radius direction at the time of circularly forming the stator, which makes it difficult to keep the mechanical precision of the stator. Therefore, when the stator is assembled in the electric motor, the magnetic performance of the magnetic material is decreased to cause problems that the efficiency of the electric motor becomes worse, the magnetic unbalance may be generated, and vibration or noise may be generated on driving the motor.

Further, in the above example, the connection portion is made thin. Even if the connection portion is made bendable by some means in the stator, the confronting surfaces 101b and 101c of the end portions are easily dislocated in the radius direction, which causes the same problem as above.

Further, in the above example, the confronting surfaces 102a and 102b of the connection portion and the confronting surfaces 101b and 101c of the end portions have a straight line portion. Even if the portions have an arc portion, the confronting surfaces 101b and 101c of the end portions are easily dislocated in the radius direction, which causes the same problem as above.

SUMMARY OF THE INVENTION

The present invention aims to provide the stator iron core of the electric motor which improves the efficiency of the electric motor and reduces vibration or noise by relieving the stress applied to the bottom portion of the slot at the time of manufacturing or integrating the electric motor.

Further, the present invention aims to enable to easily keep the good mechanical precision at the time of manufacturing the electric motor, and aims to decrease the reduction of efficiency, the vibration or noise of the electric motor.

According to one aspect of the present invention, in a stator iron core of an electric motor having plural magnetic pole segments, each of the plural magnetic pole segments has a back yoke portion and a teeth portion projected from the back yoke portion, each of the plural magnetic pole segments is connected so as to be bendable via a connection portion provided to the back yoke portion, the stator iron core is circularly formed by bending the connection portions of the plural magnetic pole segments, and each of the plural magnetic pole segments is made so that a bottom portion of a slot constituted by the back yoke portion and the teeth portion has a curved line after circularly forming the stator iron core.

According to another aspect of the invention, in a stator iron core of an electric motor having plural magnetic pole segments, each of the plural magnetic pole segments has a back yoke portion and a teeth portion projected from the back yoke portion, each of the plural magnetic pole segments is connected so as to be bendable via a connection portion provided to the back yoke portion, the stator iron core is circularly formed by bending the connection portions of the plural magnetic pole segments, and the magnetic pole segment has a notch on an outer circumference of the back yoke portion.

According to another aspect of the invention, in a stator iron core of an electric motor comprising plural magnetic pole segments which are connected and confronted by plural confronting surfaces, two of the confronting surfaces are made to have V-shaped surfaces.

According to another aspect of the invention, an electric motor includes the stator iron core of the invention.

According to another aspect of the invention, a compressor includes the electric motor of the invention.

According to another aspect of the invention, a method for manufacturing a stator iron core of an electric motor, having:

making plural magnetic pole segments, each of which has a back yoke portion and a teeth portion projected from the back yoke portion;

connecting the plural magnetic pole segments so as to be bendable via a connection portion provided to the back yoke portion;

circularly forming the stator iron core by bending the connection portion of the plural magnetic pole segments after winding the coil wire, and in the method, the making the plural magnetic pole segments includes making projected portions so that a bottom portion of a slot constituted by the back yoke portion and the teeth portion has a curved line when the stator iron core is circularly formed.

According to another aspect of the invention, a method for manufacturing a stator iron core of an electric motor, having:

making plural magnetic pole segments, each of which has a back yoke portion and a teeth portion projected from the back yoke portion;

providing a notch on an outer circumference of the back yoke portion;

connecting the plural magnetic pole segments so as to be bendable via a connection portion provided to the back yoke portion; and circularly forming the stator iron core by bending the connection portion of the plural magnetic pole segments after winding the coil wire.

According to yet another aspect of the invention, a method for manufacturing a stator iron core of an electric motor, having:

making plural magnetic pole segments connected via connection portions, having two end portions, wherein each of the plural magnetic pole segments has confronting surfaces at both sides of the connection portions;

making a V-shaped convex contact portion on the confronting surface of one of the two end portions;

making a V-shaped concave contact portion on the confronting surface of another of the two end portions;

joining the confronting surfaces of the connection portions; and finally joining the confronting surfaces of the end portions so as to form the stator iron core.

BRIEF EXPLANATION OF THE DRAWINGS

A complete appreciation of the present invention and many of the attendant advantages thereof will be readily obtained as the same becomes better understood by reference to the following detailed description when considered in connection with the accompanying drawings, wherein.

DESCRIPTION OF PREFERRED EMBODIMENTS

Embodiment 1

In the following, the first embodiment of the present invention will be explained by referring to the figures.

Figure 1:
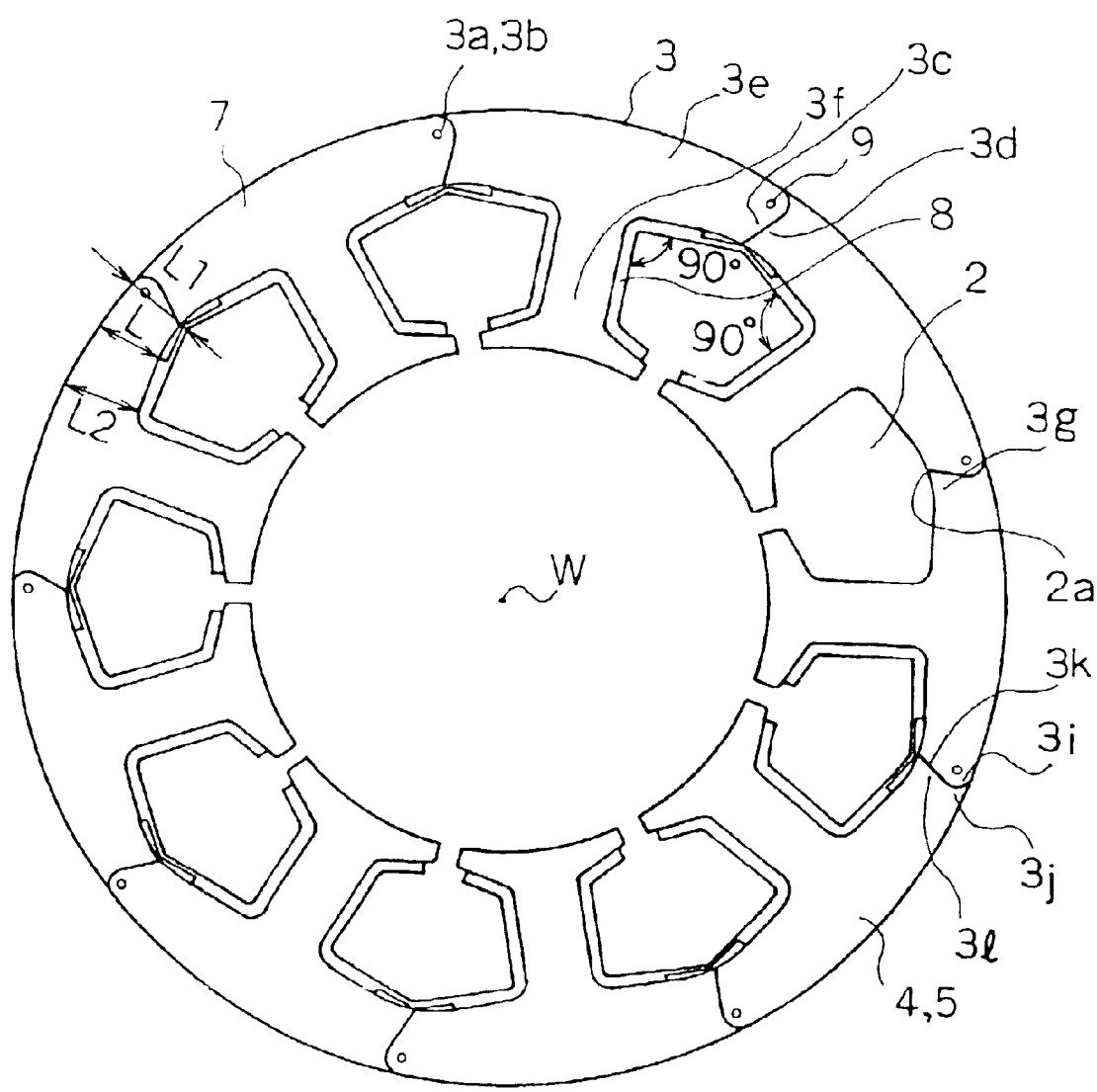
FIG. 1 shows a plan view of a stator of an electric motor according to the first embodiment of the present invention.
Figure 2:
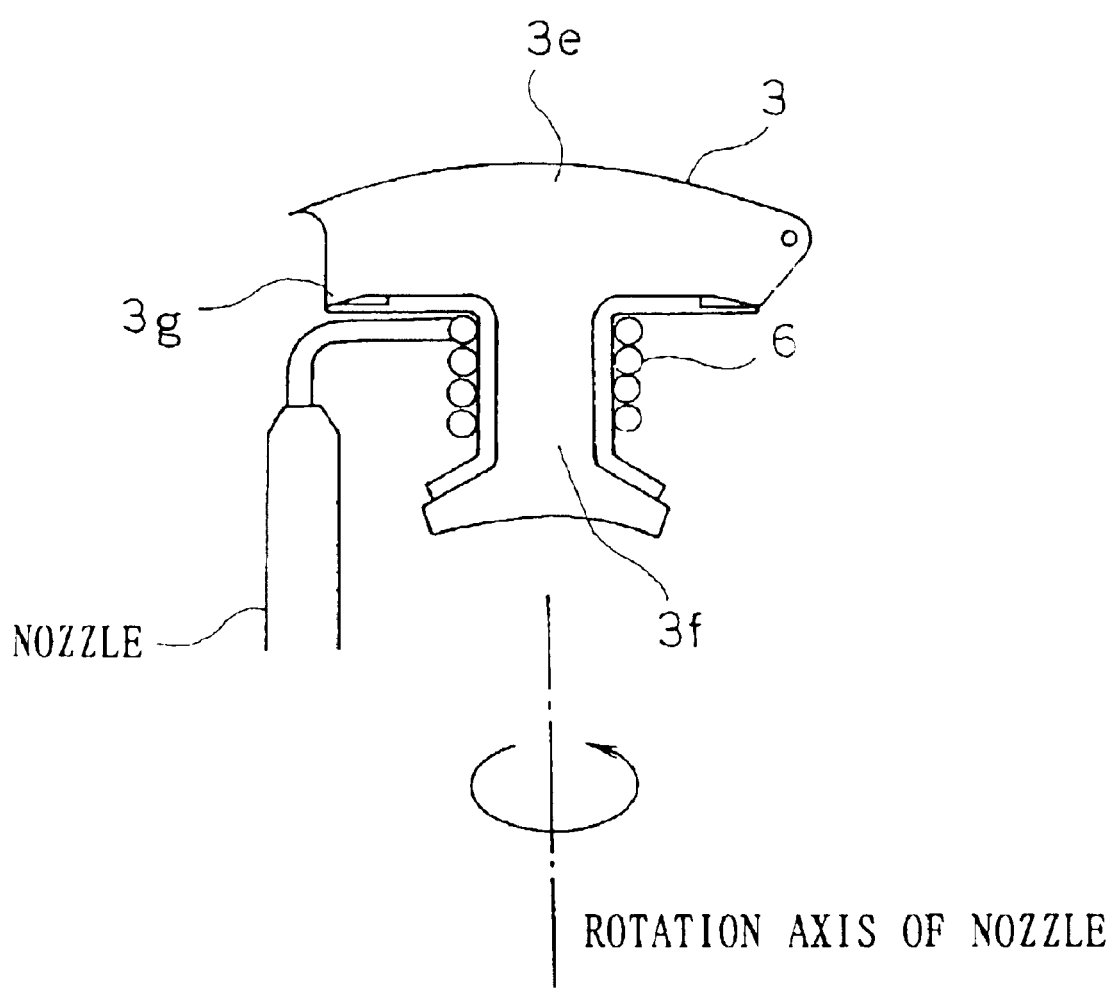
FIG. 2 is a plan view showing a portion of the electric motor and explaining how to wind a coil wire of the stator of the electric motor according to the first embodiment of the invention.

FIGS. 1 and 2 show the first embodiment. FIG. 1 is a plan view of a stator of an electric motor, and FIG. 2 is a plan view showing a part of the electric motor and explaining how to wind a coil wire of the stator of the electric motor.

In FIG. 1, a reference numeral 1 shows a plate-shaped core segment (magnetic pole segment) made of magnetic material, and a reference numeral 9 shows a connection portion (also called as a joint portion) consisting of a concave portion 3a and a convex portion 3b provided to both surfaces of one end of the magnetic pole segment 3 as a connection means. 4 shows the first iron core member in which plural magnetic pole segments 3 are aligned via an end face 3c and an end face 3d of each segment.

A reference numeral 5 shows the second iron core member in which plural magnetic pole segments 3 are aligned, and the second iron core member and the first iron core member are stacked or laminated alternately. The concave portion 3a of a certain magnetic pole segment 3 is engaged with the convex portion 3b of an adjoining magnetic pole segment so that the magnetic pole segments 3 are connected so as to turn freely around a center of the concave portion 3a and the convex portion 3b. A reference numeral 7 shows an iron core which is circularly formed by turning the concave portion 3a and the convex portion 3b of the connection portion 9 of each magnetic pole segment 3 made by laminating both iron core members.

A reference numeral 3e shows a back yoke portion of the magnetic pole segment 3, and 3f shows a teeth portion.

2 shows a slot formed by the back yoke portion 3e and the teeth portion 3f, and 2a shows a bottom portion of the slot. The bottom portion 2a of the slot is constituted by the back yoke portions 3e of the first iron core member 4 and the second iron core member 5. The bottom portion 2a has a curved line and does not have a fine angle.

A reference numeral 8 shows an insulator member coated on the teeth portion 3f to cover a wall of the teeth portion 3f. The insulator member wall of the back yoke portion makes around 90° with the insulator member wall of the teeth portion 3f, and further the insulator member 8 covers a projected portion 3g of the back yoke portion 3e.

A coil wire is wound in the slot 2 in this embodiment, however, the coil wire is not illustrated in FIG. 1 for clarifying the explanation. An illustration of the insulator member 8 is partially omitted, too.

The connection portion 9 is provided at an outer circumference side of the back yoke portion 3e. At around the connection portion 9, the end faces 3c and 3d form a male shape 3i and a female shape 3j, each having a half circular shape with a center of the connection portion 9. On the other side, a straight line portion 3k and a straight line portion 31 are formed from around the connection portion 9 toward the projected portion 3g. Further, by providing the projected portion 3g as shown in FIG. 1, it becomes possible to make a length L1 of the end portion of the back yoke portion 3e in the radius direction equal to a length L2 of the center portion of the back yoke portion 3e in the radius direction. Another structure can be made in which a length L of the back yoke portion 3e in the radius direction has the same size at any portion (L=L1=L2) and the curved line of the bottom portion 2a of the slot is made to be an arc of a circle having a center which is a center W of a rotation axis of the rotor.

The stator is structured as described above, the bottom portion 2b of the slot forms the curved line, so that the stress of the load is distributed to the straight line portions 3k and 3l formed from around the connection portion 9 toward the projected portion 3g, and is not concentrated to the bottom portion 2a of the slot at the time of forming the iron core 7 circularly or at the time of fixing the stator of the electric motor in the housing and the like by press-fitting or shrink-fitting. Therefore, the magnetic performance is not lost, and further problems can be eliminated that the efficiency of the electric motor becomes worse, sufficient stiffness cannot be kept, or vibration or noise is generated on driving the electric motor.

Further, when the bottom portion 2a of the slot is formed by the curved line, the portion 3g is projected. The coil wire 6 is wound so that a nozzle keeps parallel to the teeth portion 3f as shown in FIG. 2. At this time, the projected portion 3g may injure the coil wire on winding the coil wire 6, and further, an undesirable space, in which the coil wire cannot be wound to avoid injuring the coil wire, may be generated at the back yoke portion 3e side. However, since the insulator member 8 is coated on the teeth portion 3f to cover the projected portion 3g, the coil wire 6 can be wound without the undesirable space and without being injured.

Embodiment 2

In the following, the second embodiment of the present invention will be explained referring to the figures.

Figure 3:
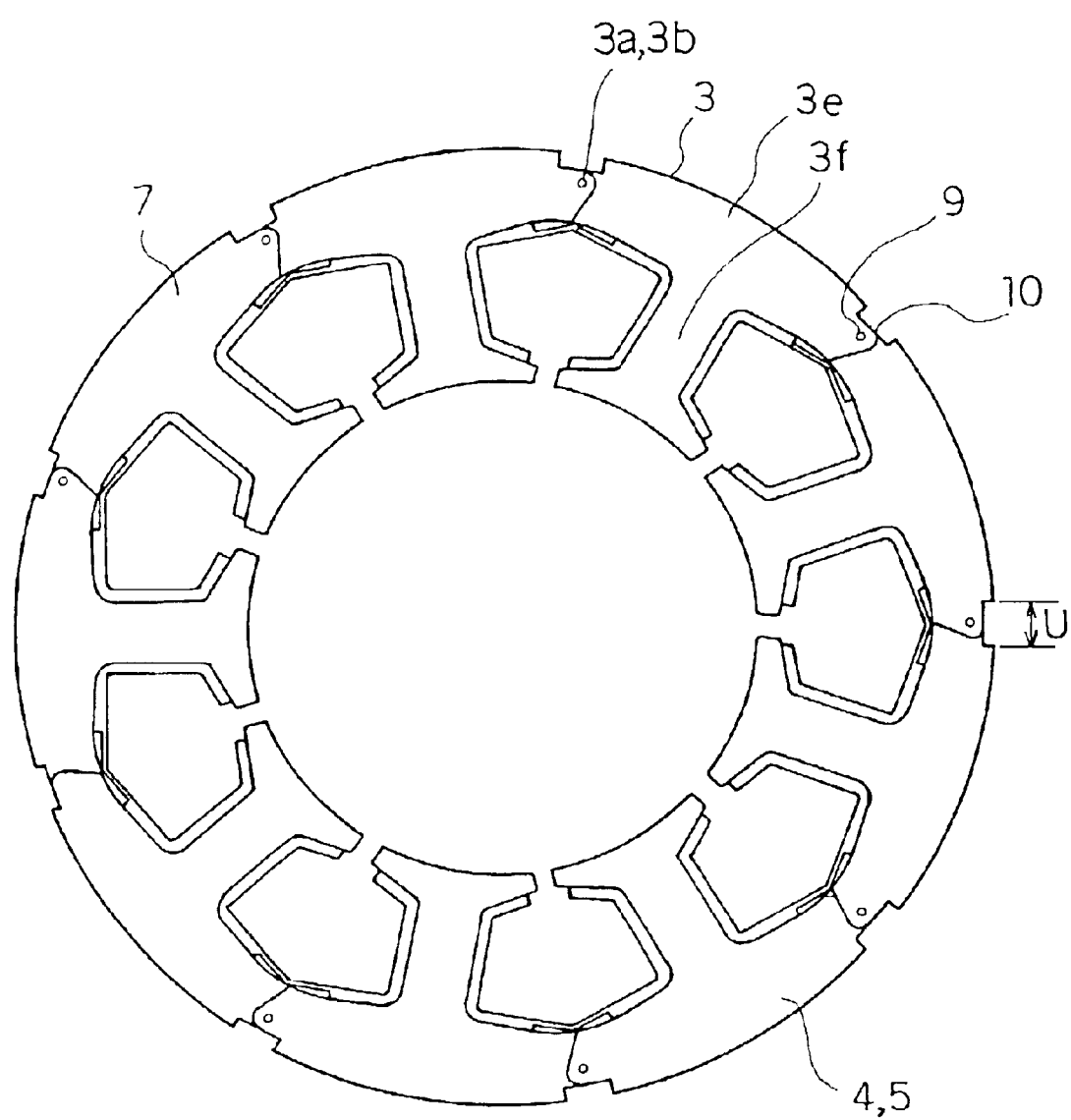
FIG. 3 shows a plan view of a stator of an electric motor according to the second embodiment of the present invention.

FIG. 3 shows a plan view of the stator of the electric motor according to the second embodiment. In FIG. 3, a reference numeral 3 shows a plate-shaped core segment (magnetic pole segment) made of the magnetic material. A reference numeral 9 shows a connection portion constituted by a concave portion 3a and a convex portion 3b provided to both surfaces of one end of the magnetic pole segment 3 as a connection means. 4 shows the first iron core member in which plural magnetic pole segments 3 are aligned via an end face 3c and an end face 3d of each segment.

A reference numeral 5 shows the second iron core member in which plural magnetic pole segments 3 are aligned, and the second iron core member and the first iron core member are stacked or laminated alternately. The concave portion 3a of a certain magnetic pole segment 3 is engaged with the convex portion 3b of an adjoining magnetic pole segment so that the magnetic pole segments 3 are connected so as to turn freely around a center of the concave portion 3a and the convex portion 3b. A reference numeral 7 shows an iron core which is circularly formed by turning the concave portion 3a and the convex portion 3b of the connection portion 9 of each magnetic pole segment 3 made by laminating both iron core members.

A reference numeral 3e shows a back yoke portion of the magnetic pole segment 3, and 3f shows a teeth portion. 10 shows a notch formed at a place opposite to the connection portion 9 and extended to the direction of rotation axis of the rotor. A coil wire is wound in the slot 2 in this embodiment, however, the coil wire is not illustrated in FIG. 3 for clarifying the explanation.

When the stator of the electric motor is fixed in the housing and the like by press-fitting or shrink-fitting, since the notch is formed at the place opposite to the connection portion 9 and extended to the direction of rotation axis of the stator, the stator of the electric motor is not directly pressed against the housing around the connection portion 9. Accordingly, the notch 10 with an appropriate size can adjust the load applied to the connection portion 9 when the stator of the electric motor is inserted in the housing and the like by press-fitting or shrink-fitting.

Consequently, it is possible to minimize the stress applied to the connection portion 9 with keeping the sufficient stiffness by selecting an appropriate length U of the notch 10 in the circumference direction.

Further, the insulator film covering the magnetic material is removed from the connection portion 9 on forming the iron core 7, the concave portion 3a or the convex portion 3b. Accordingly, the insulation resistance is lowered between iron core members 4 and 5, eddy current is generated on driving the electric motor, and further, the efficiency of the motor is reduced.

The above problem can be also solved by the present embodiment. By changing the length U of the notch 10 in the circumference direction, the contact power between the inside of the housing and the outer circumference of the stator of the electric motor can be minimized while keeping a required contact power. By minimizing the contact power, the insulation resistance of each of the iron core members 4 and 5 in the direction of rotation axis is not lowered or increased. Therefore, it becomes possible to minimize the reduction of the efficiency of the electric motor caused by the eddy current generated in the iron core 7. Therefore, sufficient stiffness of the stator can be kept without losing the magnetic performance of the magnetic material or reducing the efficiency of the electric motor caused by the eddy current.

Embodiment 3

In the following, the third embodiment of the present invention will be explained referring to the figures.

Figure 4:
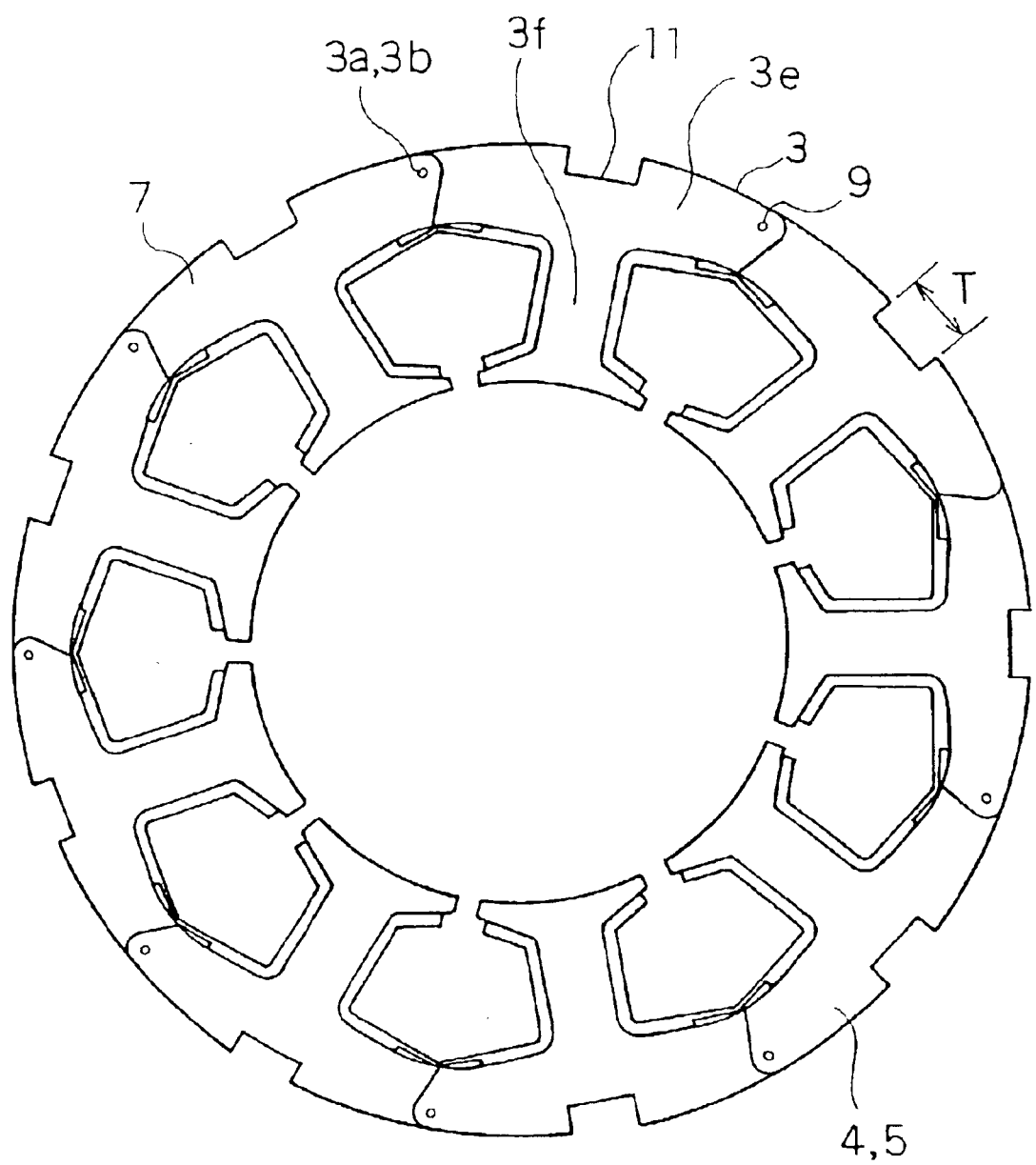
FIG. 4 shows a plan view of a stator of an electric motor according to the third embodiment of the present invention.

FIG. 4 shows a plan view of the stator of the electric motor according to the third embodiment. In FIG. 4, a reference numeral 3 shows a plate magnetic pole segment made of the magnetic material. A reference numeral 9 shows a connection portion constituted by a concave portion 3a and a convex portion 3b provided to both sides of one end of the magnetic pole segment 3 as a connection means. 4 shows the first iron core member in which plural magnetic pole segments 3 are aligned via an end face 3c and an end face 3d of each segment.

A reference numeral 5 shows the second iron core member in which plural magnetic pole segments 3 are aligned, and the second iron core member and the first iron core member are stacked or laminated alternately. The concave portion 3a of a certain magnetic pole segment 3 is engaged with the convex portion 3b of an adjoining magnetic pole segment so that the magnetic pole segments 3 are connected so as to turn freely around a center of the concave portion 3a and the convex portion 3b. A reference numeral 7 shows an iron core which is circularly formed by turning the concave portion 3a and the convex portion 3b of the connection portion 9 of each magnetic pole segment 3 made by laminating both iron core members.

A reference numeral 3e shows a back yoke portion of the segment 3, and 3f shows a teeth portion. 11 shows a notch formed at a place opposite to the teeth portion 3f and extended to the direction of rotation axis of the rotor.

A coil wire is substantially wound in the slot 2 in this embodiment, however, the coil wire is not illustrated in FIG. 4 for clarifying the explanation.

When the stator of the electric motor is inserted in the housing and the like by press-fitting or shrink-fitting, since the contact area can be changed by changing a length T of the notch in the circumference direction, it becomes possible to minimize the stress of compression applied to the stator of the electric motor with the sufficient fixing force.

Further, the notch 11 is located at the place opposite to the teeth portion 3f, and the magnetic flux of the place of the notch is lower compared with other portion of the iron core on driving the electric motor. Therefore, providing the notch at this place causes the reduction of the efficiency of the electric motor less than a case in which the notch is provided at other place of the iron core.

Embodiment 4

In the following, the fourth embodiment of the present invention will be explained referring to the figures.

Figure 5:
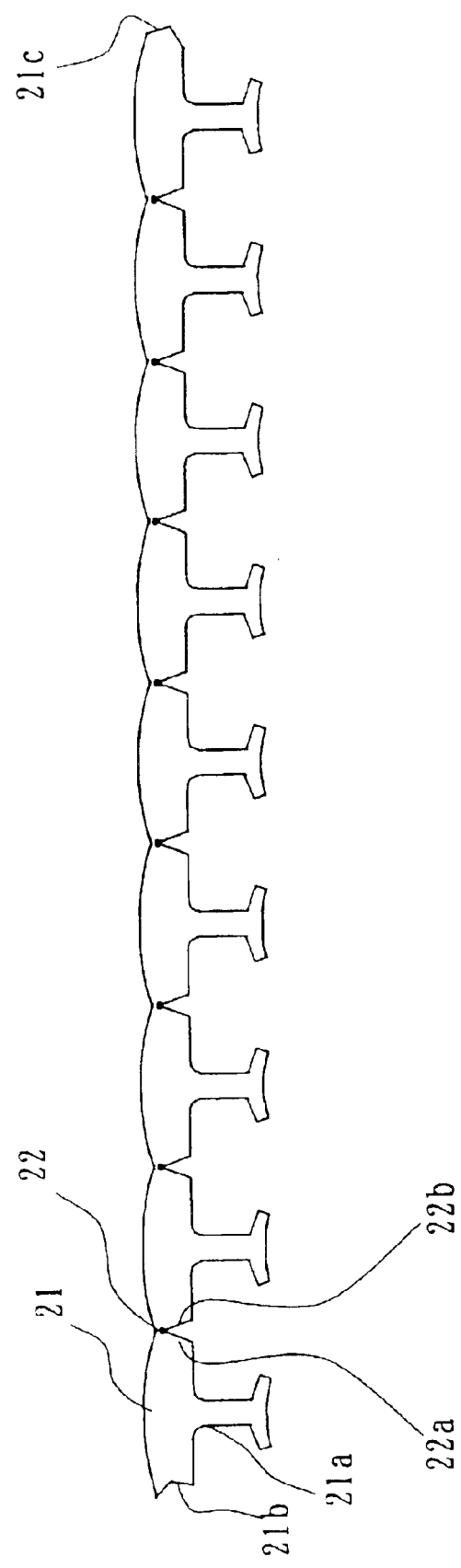
FIG. 5 shows a plan view of a band-type stator of an electric motor according to the fourth embodiment of the present invention.
Figure 6:
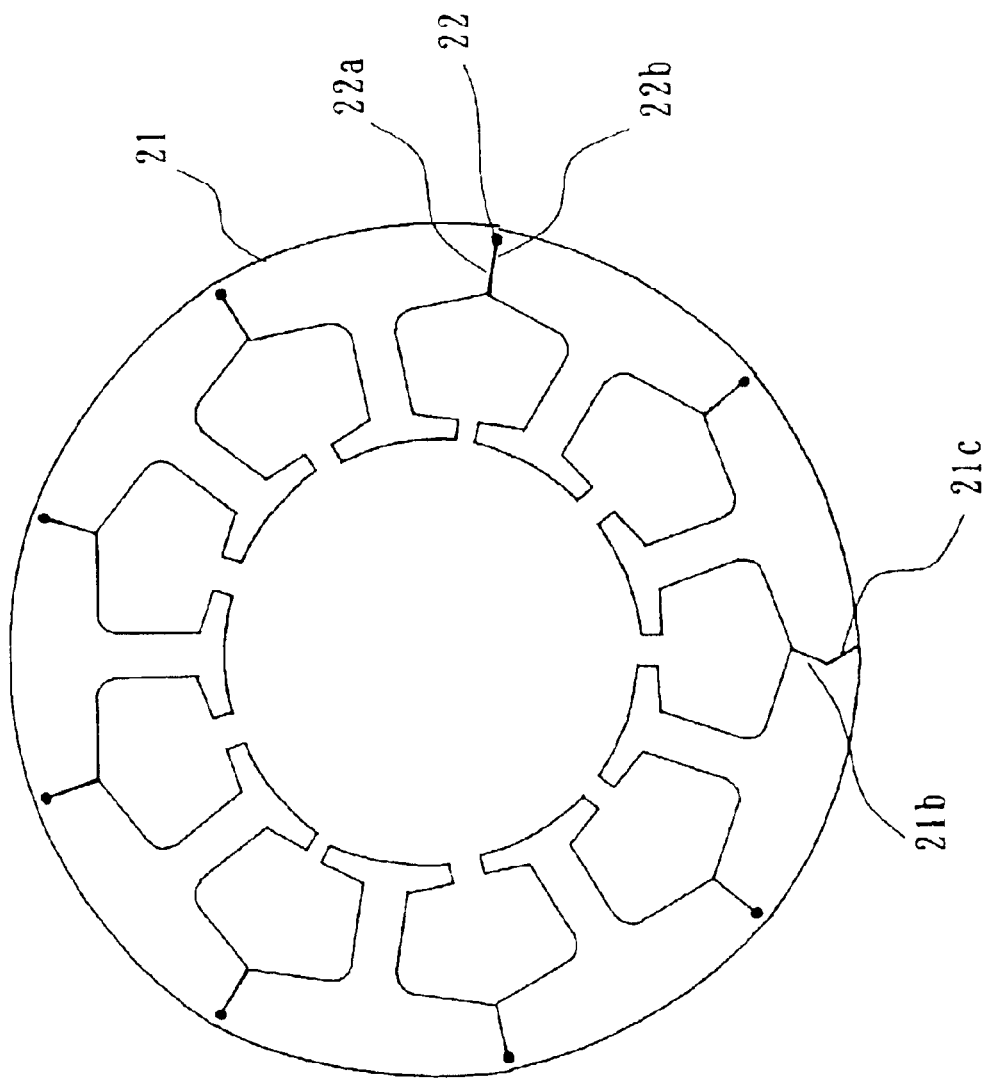
FIG. 6 shows a plan view of a stator of an electric motor circularly formed according to the fourth embodiment of the present invention.

FIGS. 5 and 6 show the fourth embodiment. FIG. 5 shows a plan view of a band-shaped stator of the electric motor, and FIG. 6 shows a plan view of a stator of the electric motor formed circularly.

In FIG. 5, a reference numeral 21 shows a plate-shaped magnetic pole segment (also called as a core segment), and a reference numeral 22 shows a thin connection portion provided to the magnetic pole segment 21. 21a shows a teeth portion of the magnetic pole segment 21, and 22a and 22b show confronting surfaces of the connection portion located at both sides of the thin connection portion 22. 21b and 21c show V-shaped confronting surfaces of end portions, each of which is located at an opposite side to the thin connection portion 2 of the magnetic pole segment 21 placed at far end.

A method for manufacturing the stator of the electric motor structured as described above will be explained hereinafter. After the coil wire (not illustrated) is wound around the teeth portion 21a, the thin connection portion 22 of each magnetic pole segment 21 is bent, the confronting surfaces 22a and 22b of the connection portion are faced so that the location of each magnetic pole segment 21 is determined. Finally, the confronting surfaces 21b and 21c of the end portions of the both ends are faced to make a circular form, the form is fixed by welding, etc., and a terminal wire of the coil wire is electrically connected to make the stator of the electric motor.

As the stator is structured as described above, the relationship of the location of each magnetic pole segment 21 should be determined by each of the confronting surfaces 22a and 22b of the connection portions and the confronting surfaces 21b and 21c of the end portions. Since the confronting surfaces 21b and 21c of the end portions have V-shapes of male shape and female shape, the movement of the stator in the radius direction will be restricted when the V-shape of male shape and the V-shape of female shape are faced. Accordingly, the mechanical precision of the stator of the electric motor will be directly determined. It is possible to easily secure the mechanical precision by improving the precision of punching the magnetic pole segment 21 and so on.

In the present embodiment, the connection portion is made thin, however, the same effect can be brought when the embodiment is applied to a case in which a connection portion is made by one of other ways and the stator is circularly formed from the aligned plural magnetic pole segments 21.

Embodiment 5

In the following, the fifth embodiment of the present invention will be explained referring to the figures.

Figure 7:
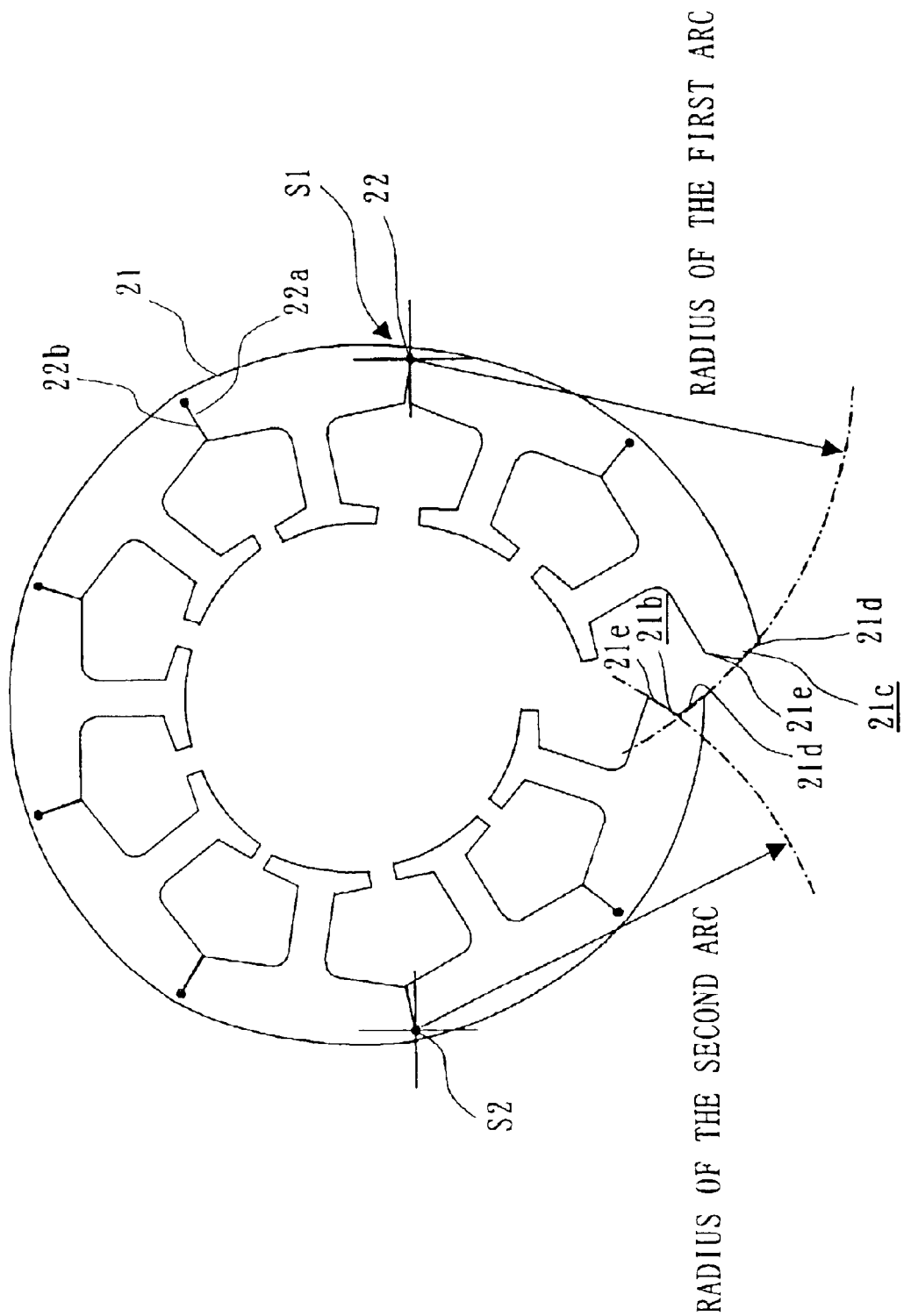
FIG. 7 shows a plan view of a stator of an electric motor just before circularly formed according to the fifth embodiment of the present invention.

FIG. 7 shows the fifth embodiment and is a plan view of the stator of the electric motor just before formed circularly.

In FIG. 7, a reference numeral 21 shows a plate-shaped magnetic pole segment made of magnetic material, and a reference numeral 22 shows a thin connection portion provided to the magnetic pole segment 21. 22a and 22b show confronting surfaces of the connection portions located at both sides of the thin connection portion 22. 21b and 21c show V-shaped confronting surfaces of end portions, each of which is located at opposite side to the thin connection portion 2 of the magnetic pole segment 21 placed at far end.

The confronting surfaces 21b and 21c of the end portions are constituted by two arc shapes, the first arc 21d and the second arc 21e. Centers of the arcs are approximately the same to turning centers S1 and S2 which are turning points for bending the thin connection portions of any two of the magnetic pole segments 21.

The stator is structured as described above, turning centers S1 and S2 of the thin connection portions of specific magnetic pole segments 21 are centers of the first arc 1d and the second arc 1e, respectively, and turning centers S1 and S2 are turning points when the both far ends of magnetic pole segment are finally to be faced. Therefore, when the thin connection portion 22 of the specific magnetic pole segment is bent at last, the magnetic pole segments 21 are not disturbed each other, and the stator can be formed circularly out of plural magnetic pole segments.

Accordingly, it is no need to determine an order of bending magnetic pole segments at bending process, and manufacturing the stator can be performed more flexibly in the aspect of facilities. Further, since the disturbance at bending process can be eliminated, the high reliability can be obtained in manufacturing the stator of the electric motor.

In the above embodiment, the connection portion is made thin. However, the same effect can be obtained by making the connection portion in one of other ways and the stator is circularly formed from the aligned plural magnetic pole segments 21.

Embodiment 6

In the following, the sixth embodiment of the present invention will be explained referring to the figures.

Figure 8:
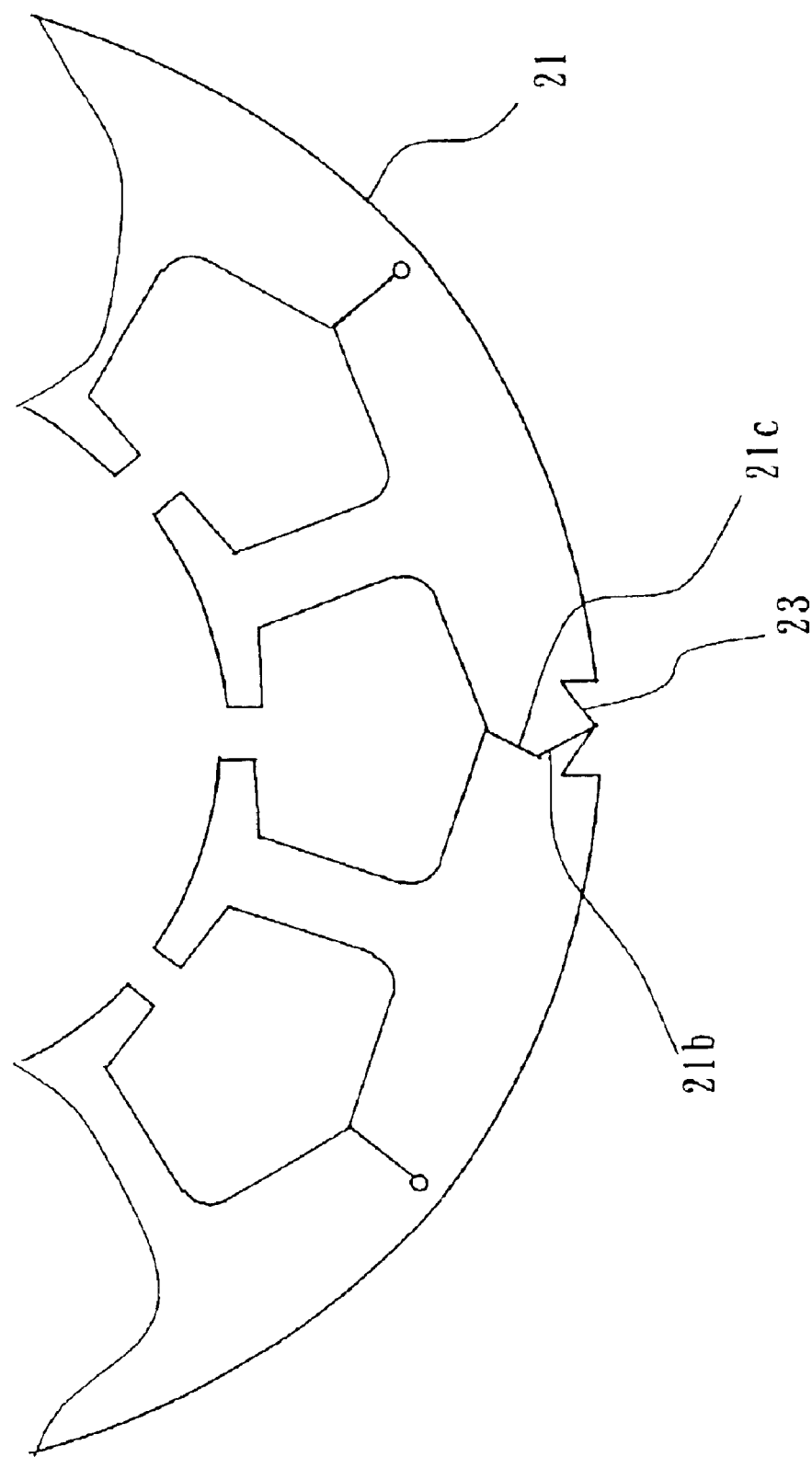
FIG. 8 show a plan view of a stator of an electric motor circularly formed according to the sixth embodiment of the present invention.

FIG. 8 shows a plan view of a part of the stator of the electric motor according to the sixth embodiment.

In FIG. 8, a reference numeral 21 shows a plate-shaped magnetic pole segment made of magnetic material, and 21b and 21c show V-shaped confronting surfaces of end portions, each of which is located at the opposite side to a thin connection portion 22 of the magnetic pole segment 21 placed at far end. 23 shows a jut, which is formed on facing the confronting surfaces of the end portions, jutted out to an outer circumference of the stator. The jut 23 is located inside of the outer circumference of the stator of the electric motor.

The stator is structured as described above, on finally joining both ends of magnetic pole segments, top point of the jut 23 face to the outer circumference. Accordingly, when the confronting surfaces 21b and 21c of the end portions are joined, it is possible to easily blow an electric arc to the top point of the jut 23, which requires to be welded, and possible to weld the confronting surfaces more sufficiently compared with welding to a flat plane or an arc plane of the outer circumference.

Embodiment 7

An embodiment for the electric motor and the compressor will be explained in the following.

Figure 9:
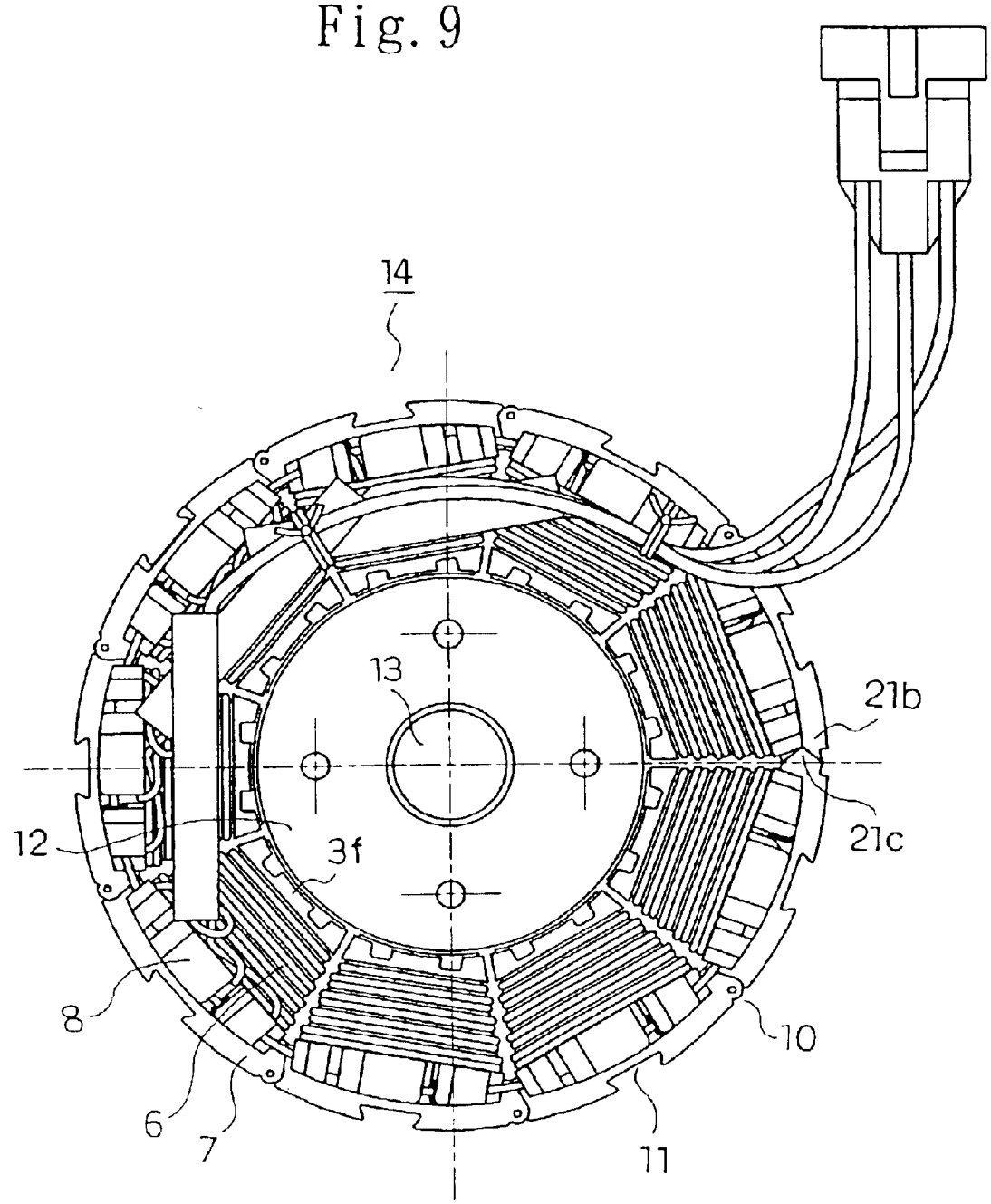
FIG. 9 shows a plan view of an electric motor according the seventh embodiment.

FIG. 9 shows a plan view of an electric motor employing the stator iron core of the electric motor according to the first through fourth embodiments.

After the coil wire 6 is wound around the insulator member 8 on the teeth portion 3f of the stator iron core 7 of the electric motor, appropriate electric wire connections are made, the rotor 12 having the rotation axis 13 is inserted into the stator. Accordingly, the electric motor 14 is formed.

The application of the present invention is not limited to a case employing the stator iron core according to the first through fourth embodiments, but the invention can be also applied to a case employing the stator iron core according to one embodiment or a certain combination of more than two embodiments from the first through sixth embodiments.

Figure 10:
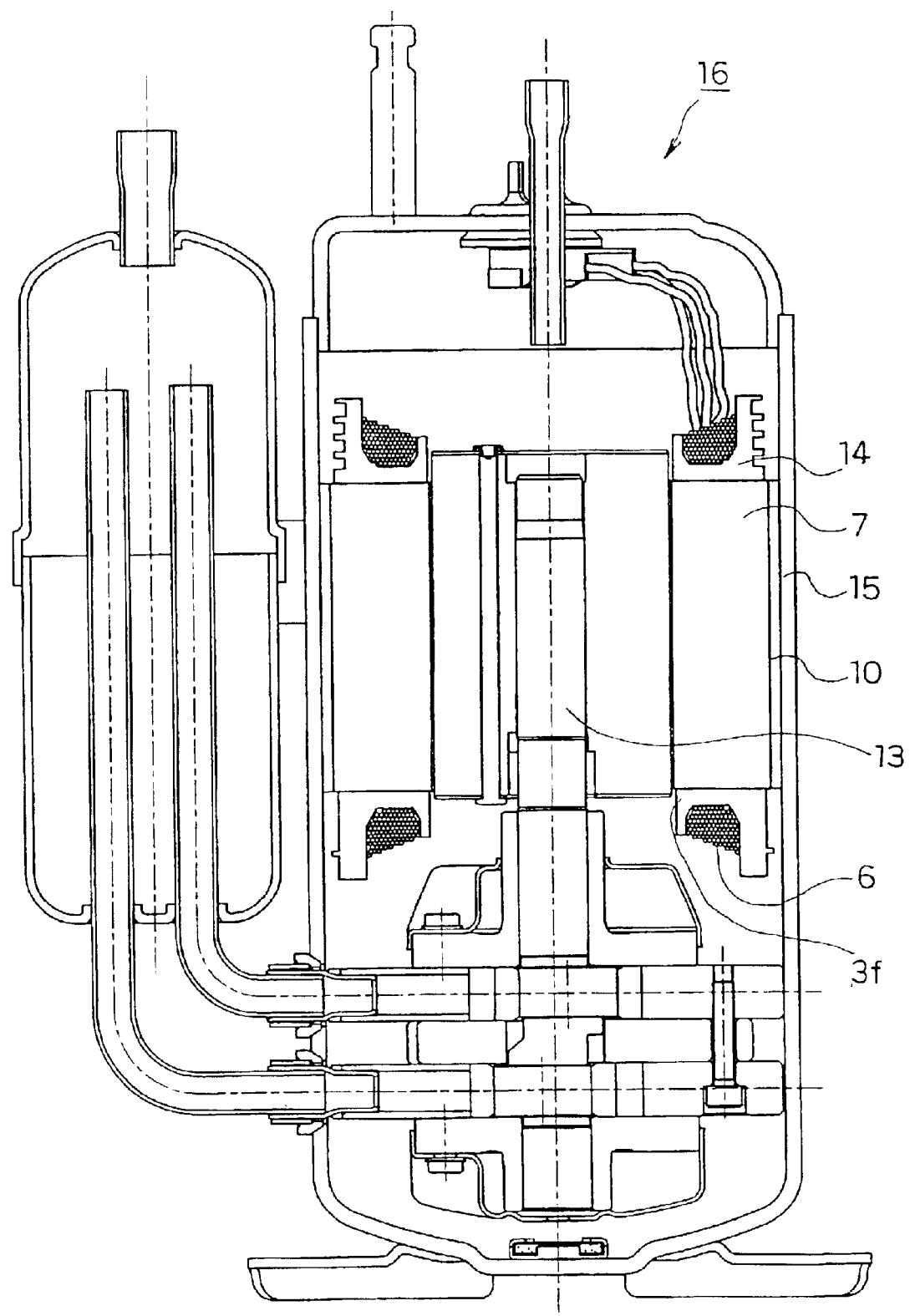
FIG. 10 shows a cross sectional view of a compressor according to the seventh embodiment taken along vertically.
Figure 11:
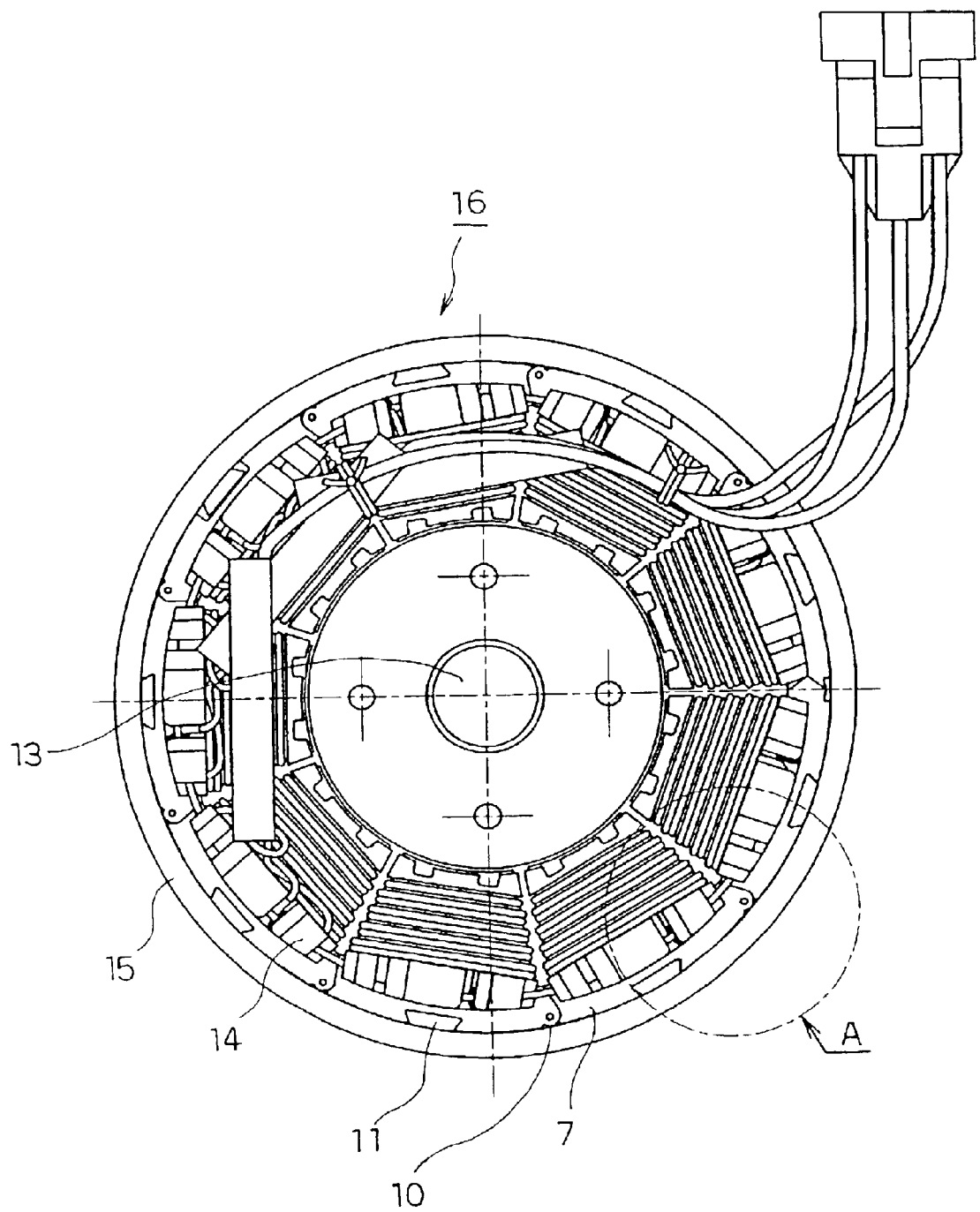
FIG. 11 shows a top view of the compressor of the seventh embodiment on integrating the electric motor.

FIG. 10 shows a cross sectional view of the compressor 16 containing the electric motor 14 taken along vertically. FIG. 11 shows a plan view of the compressor 16 when the electric motor is integrated, and FIG. 12 shows an enlarged view of a portion indicated as A of FIG. 11.

The electric motor 14 is integrated into the housing 15 of the compressor and the like by shrink-fitting or press-fitting, appropriate electric wire connections are made, and the rotation axis 13 of the compressor 16 can be driven.

Figure 12:
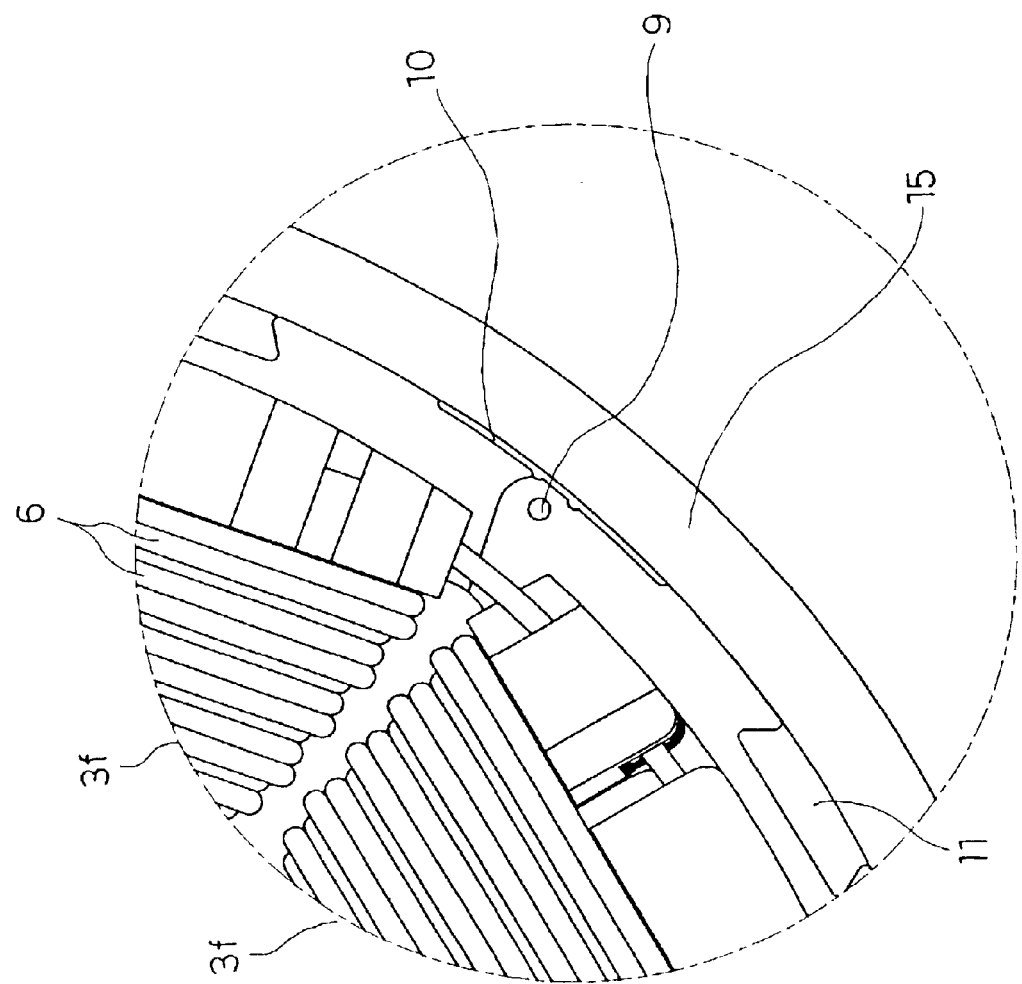
FIG. 12 shows a partial enlarged view of the compressor on integrating the electric motor (an enlarged view of a portion indicated A of FIG. 11)
Figure 13:
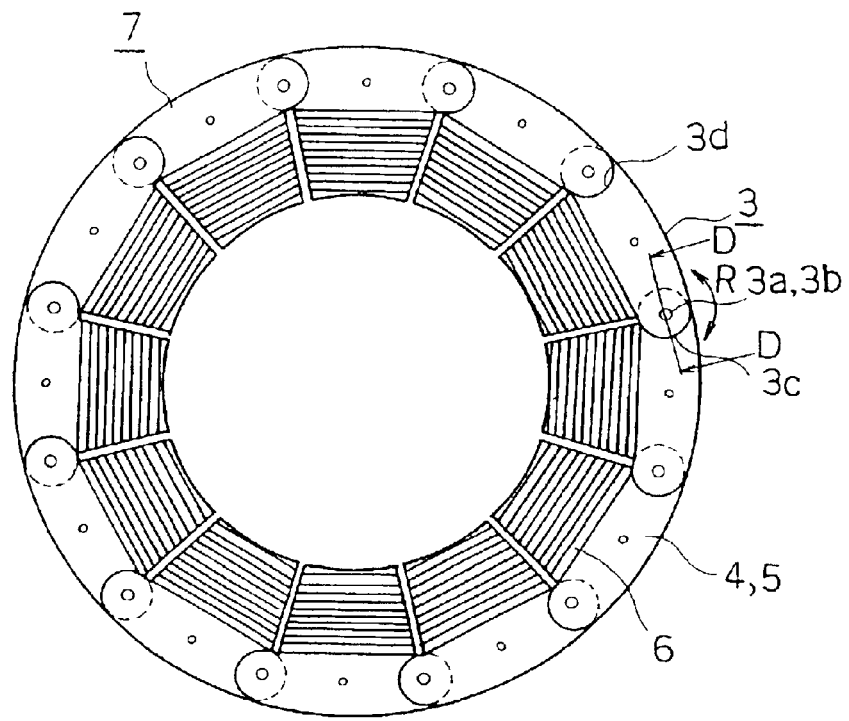
FIG. 13 shows a plan view of a conventional electric motor.
Figure 14:
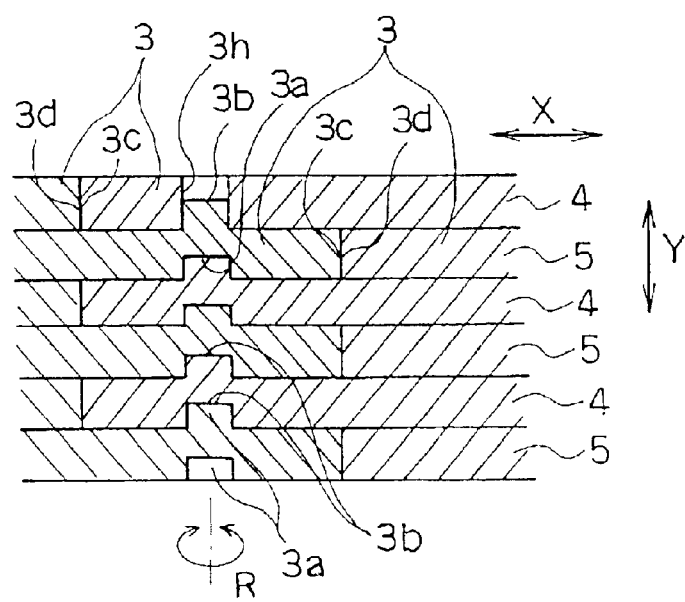
FIG. 14 shows a plan view of a portion of a conventional electric motor.
Figure 15:
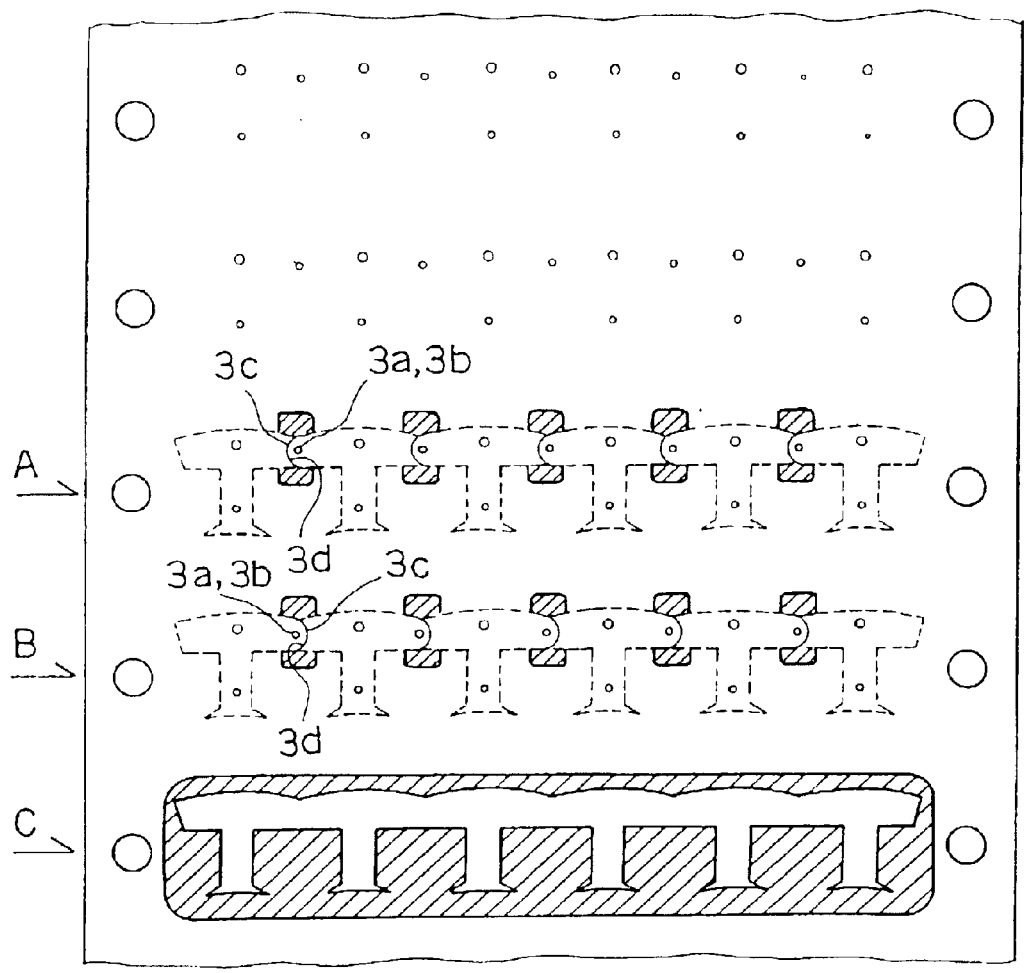
FIG. 15 shows a concept for explaining a conventional method for manufacturing the electric motor.
Figure 16:
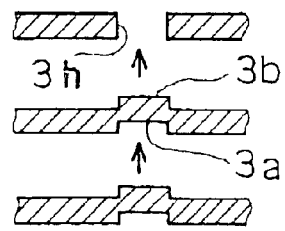
FIG. 16 shows a plan view of a portion of the conventional electric motor.
Figure 17:
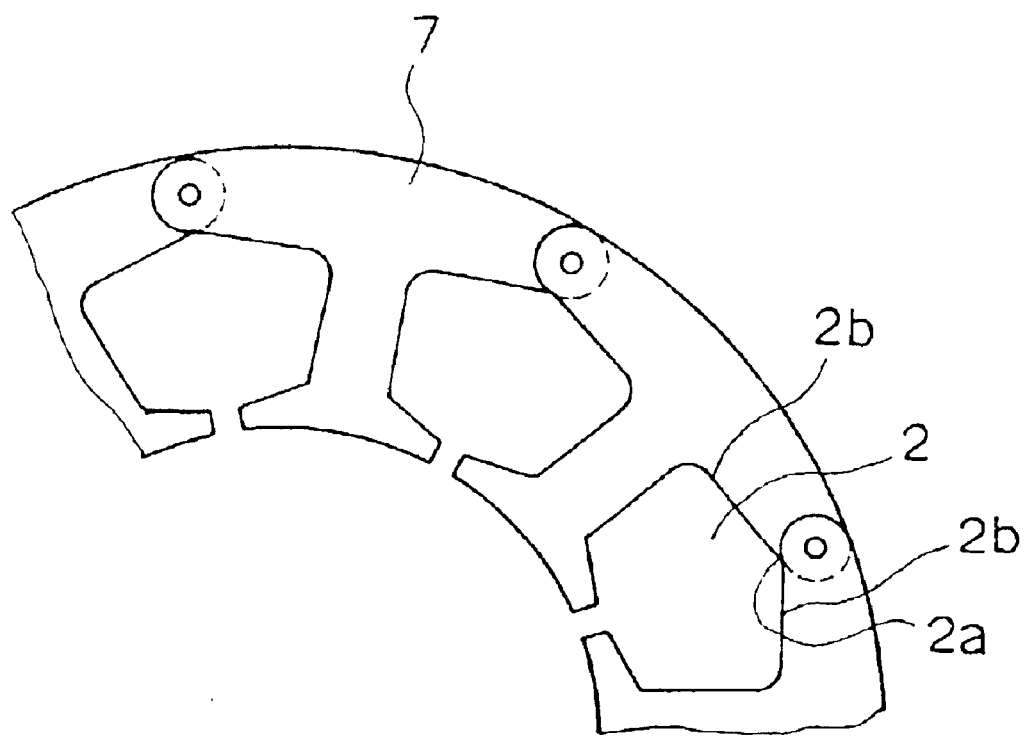
FIG. 17 shows a plan view of a portion of the conventional electric motor.
Figure 18:
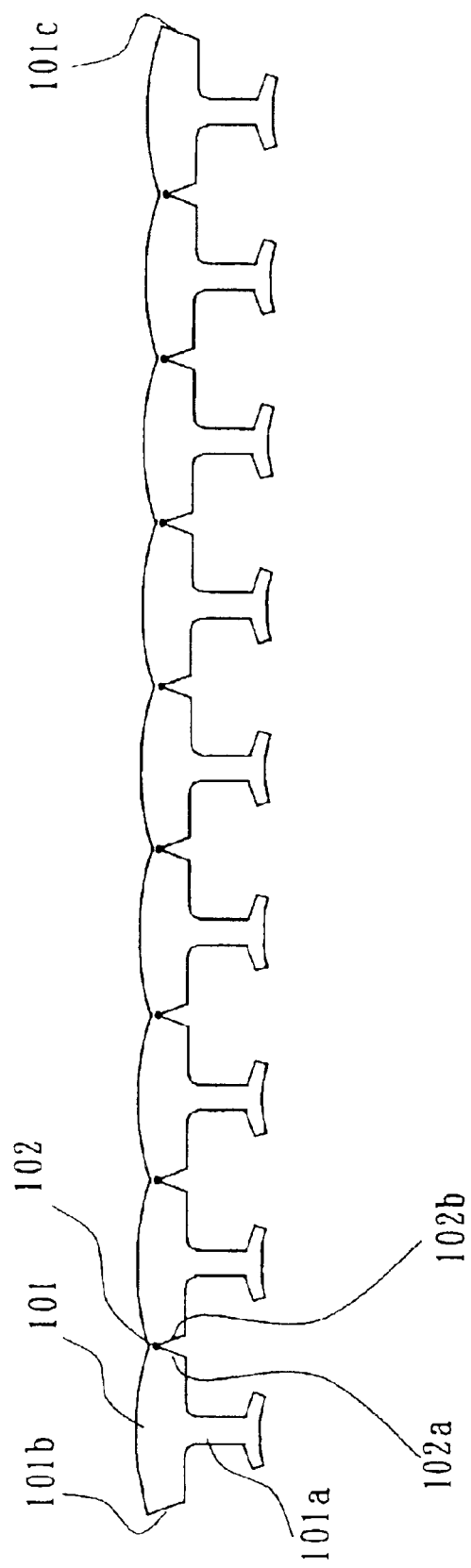
FIG. 18 shows a plan view of a stator of the conventional electric motor.
Figure 19:
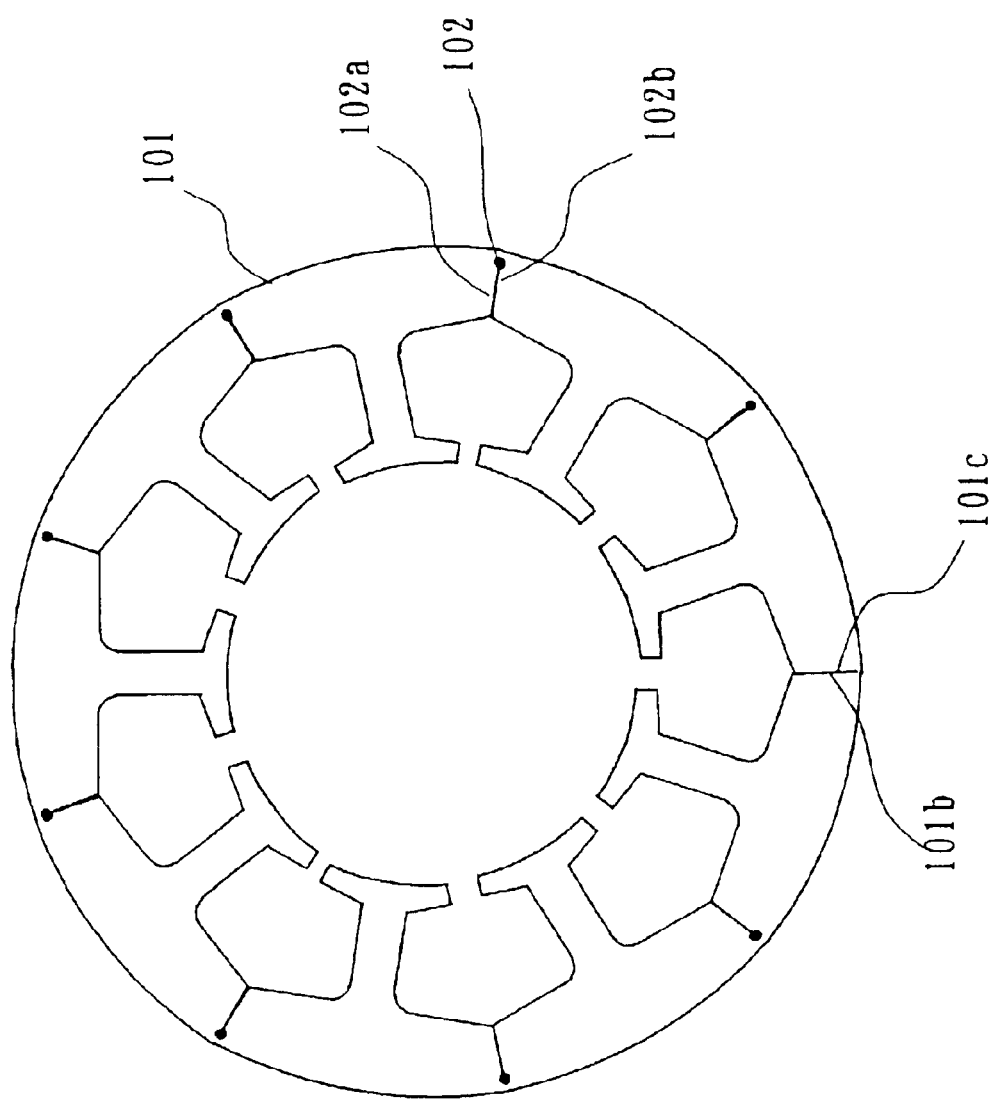
FIG. 19 shows a plan view of the stator of the conventional electric motor.

As shown in the enlarged view of FIG. 12, the notch 11 is provided at the place opposite to the teeth portion, so that it is possible to fix the magnetic pole segment 3 by engaging the notch 11 with the winder chuck on winding the coil wire 6. Since the coil wire 6 is wound around the teeth portion 3f, it is possible to stably place the magnetic pole segment 3 by fixing the magnetic pole segment 3 using the notch 11 provided to the place opposite to the teeth portion 3f. Further, on integrating the electric motor in the housing 15 of the compressor 16, the notches 10 and 11 can be a passage for cooling gas or lubricating oil, and on inserting the electric motor by press-fitting, the contact area can be made smaller. Accordingly, it becomes easy to insert the electric motor into the housing 15 of the compressor 16.

In the stator iron core of the electric motor according to the first through third embodiments, the magnetic pole segment is structured so that the bottom portion of the slot constituted by the back yoke portion and the teeth portion comes to have a curved line after the stator iron core is formed circularly. Accordingly, since the bottom portion of the slot has a curved line, on forming the iron core circularly or fixing the stator of the electric motor in the housing and the like by press-fitting or shrink-fitting, compression stress is not concentrated, which avoids to lose the magnetic performance of the magnetic material. Therefore, the embodiment of the invention does not reduce the efficiency of the electric motor, keeps the sufficient stiffness of the electric motor, and reduces the vibration or noise generated on driving the electric motor.

Further, the insulator member is provided to the teeth portion to cover the projected portion of the back yoke portion as well as the wall surface of the teeth portion. The wall surface of the back yoke portion of the insulator member and the wall surface of the teeth portion of the insulator member make an angle of around 90°. Therefore, possibility of injuring the coil wire by the projected portion on winding the coil wire is reduced.

Further, the notch is provided in the axial direction on the outer circumference of the back yoke portion at a place opposite to the connection portion, so that it becomes possible to reduce the stress generated at the connection portion on forming the iron core circularly or integrating the stator of the electric motor in the housing and the like by press-fitting or shrink-fitting, and reduce the damage caused by eddy current. Therefore, the embodiment of the invention does not reduce the efficiency of the electric motor, keeps sufficient stiffness of the electric motor, and reduces the vibration or noise generated during driving the electric motor.

Further, the notch is provided in the axial direction at a place opposite to the connection portion, so that the inner surface of the housing never contact the connection portion on integrating the stator in the housing by press-fitting or shrink-fitting, and the stator is seldom influenced by the dimensional precision of the housing. Further, since the holding force is applied to both sides of a place located far from the turning center of the connection portion, moment, which causes magnetic pole segments to contact without any space, is loaded to the connection portion. Therefore, each of the iron core members of the stator iron core of the electric motor becomes the same status to an iron core member made by punching (stamping out) as one circular (round) element, so that circularities of the outer circumference and the inner circumference of the stator of the electric motor become better. Consequently, air gap becomes uniform between the stator and the rotor of the electric motor on driving the motor, which eliminates magnetic unbalance, and further, reduces the noise or vibration of the electric motor.

Further, since the dimensional precisional allowance of the housing is around some tens $\mu$m in the radius direction at maximum of the circularity, the notch having a depth of more than 0.1 mm in the radius direction will be sufficient to obtain the above effect.

Further, the notch is provided on the outer circumference of the back yoke portion at a place opposite to the teeth portion, so that the stress of compression can be reduced on forming the iron core circularly or integrating the stator of the electric motor to the housing by press-fitting or shrink-fitting. Accordingly, the embodiment does not reduce the magnetic performance of the magnetic material nor reduce the efficiency of the electric motor, keeps sufficient stiffness, and reduces the vibration or noise generated on driving the electric motor.

Further, since the stator of the electric motor according to the fourth through sixth embodiments has V-shaped confronting surfaces of the end portions, the relationship of the location of each magnetic pole segment should be determined by each of the confronting surfaces of the connection portions and the confronting surfaces of the end portions. Since the confronting surfaces of the end portions have V-shapes, the movement of the stator in the radius direction will be restricted when the V-shaped end portions are faced. Accordingly, the mechanical precision of the stator of the electric motor will be directly determined. It is possible to easily secure the mechanical precision by improving the precision of punching the magnetic pole segment and so on. Therefore, the electromagnetic noise or vibration caused by a bad mechanical precision can be reduced, and further, the stator of the electric motor having high density of coiled wire, high efficiency, low noise, and low vibration can be easily obtained.

Each of the V-shaped confronting surfaces of the end portion is formed by two arc shapes, the first arc and the second arc. Centers of the arcs are approximately the same as the center of turning at the time of bending the thin connection portion of any of the magnetic pole segments, so that the centers of turning of the thin connection portions of magnetic pole segments are centers of the first arc and the second arc, respectively, and the centers of turning are turning points when the both far ends of magnetic pole segments are to be faced at last. Therefore, when the thin connection portion of the magnetic pole segment, which is located between the above specific magnetic pole segments, is bent at last, the magnetic pole segments are not disturbed each other, and the stator can be formed circularly out of plural magnetic pole segments. Accordingly, it is no need to determine an order of bending magnetic pole segments at bending process, and manufacturing the stator can be performed more flexibly in the aspect of facilities. Further, since the interference at bending process can be eliminated, the high reliability can be obtained in integrating the stator of the electric motor.

Since the jut is formed on joining the confronting surfaces of the end portions and is projected to an outer circumference of the stator as the top point. The top point of the jut is located inside of the outer circumference of the stator of the electric motor, so that the top point of the jut faces to the outer circumference side which are to be finally joined as both ends of magnetic pole segments. Accordingly, when the confronting surfaces of the end portions are joined, it is possible to easily blow an electric arc to the top point of the jut, which requires to be welded, and possible to weld the confronting surfaces sufficiently compared with welding to a flat plane or an arc plane of the outer circumference.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. A stator iron core of an electric motor comprising plural magnetic pole segments, each including, a back yoke portion, a teeth portion projected from the back yoke portion, a connection portion provided to the back yoke portion for connecting adjacent magnetic pole segments, and a stepped-shaped unfilled notch on an outer circumference of the back yoke portion, wherein the stator iron core is circularly formed by bending the connection portions of the plural magnetic pole segments.

2. The stator iron core of the electric motor claimed in claim 1, wherein the notch is provided at a place opposite to the connection portion in an axial direction on the outer circumference of the back yoke portion.

3. The stator iron core of the electric motor claimed in claim 1, wherein the notch is provided at a place opposite to the teeth portion in an axial direction on the outer circumference of the back yoke portion.

4. An electric motor comprising the stator iron core of the electric motor claimed in claim 1.

5. A compressor comprising the electric motor claimed in claim 4.

* * * * *